United States Patent
Jakubiec et al.

[11] Patent Number: 6,027,164
[45] Date of Patent: Feb. 22, 2000

[54] COMBINATION SEAT AND ARMREST WITH STORAGE COMPARTMENTS

[75] Inventors: Steven M. Jakubiec, Bloomfield; David A. Bargiel, Troy; Richard Rogala, L'ance, all of Mich.

[73] Assignee: DaimlerChrysler Corporation, Auburn Hills, Mich.

[21] Appl. No.: 09/215,487

[22] Filed: Dec. 18, 1998

[51] Int. Cl.⁷ ........................................................ A47C 7/62
[52] U.S. Cl. .............................. 297/188.01; 297/188.07; 297/188.11; 297/378.1
[58] Field of Search ........................... 297/378.1, 188.08, 297/188.09, 188.1, DIG. 2, 188.11, 188.2, 452.55, 188.07, 188.04

[56] References Cited

U.S. PATENT DOCUMENTS

| | | |
|---|---|---|
| D. 141,295 | 5/1945 | Wright . |
| D. 297,287 | 8/1988 | Lopez . |
| D. 356,693 | 3/1995 | Meier . |
| D. 357,129 | 4/1995 | Tiramani . |
| 550,613 | 12/1895 | Harvey . |
| 2,725,923 | 12/1955 | Bachrach . |
| 2,759,529 | 8/1956 | Hagadorn . |
| 2,808,170 | 10/1957 | Bernhard . |
| 2,812,227 | 11/1957 | Hill . |
| 2,907,378 | 10/1959 | Barecki . |
| 3,093,412 | 6/1963 | Gore et al. . |
| 3,321,237 | 5/1967 | Gangell . |
| 3,336,077 | 8/1967 | Radke et al. . |
| 3,669,499 | 6/1972 | Semplonius et al. . |
| 4,668,010 | 5/1987 | Fujiwara . |
| 4,681,367 | 7/1987 | Timmers . |
| 4,883,317 | 11/1989 | Davenport . |
| 5,046,433 | 9/1991 | Kramer et al. . |
| 5,096,249 | 3/1992 | Hines . |
| 5,458,395 | 10/1995 | Skarda, Jr. . |
| 5,524,957 | 6/1996 | Gibriano . |
| 5,529,376 | 6/1996 | Jovan et al. . |
| 5,622,404 | 4/1997 | Menne . |
| 5,683,137 | 11/1997 | McDonald et al. . |
| 5,704,684 | 1/1998 | Dukatz et al. . |
| 5,720,513 | 2/1998 | Raukauskas . |
| 5,727,844 | 3/1998 | O'Quinn et al. . |
| 5,779,302 | 7/1998 | Geier et al. . |
| 5,816,650 | 10/1998 | Lucas, Jr. . |

*Primary Examiner*—Milton Nelson, Jr.
*Attorney, Agent, or Firm*—Roland A. Fuller, III

[57] ABSTRACT

A combination seat and armrest comprised of a support structure, which may be in the form of a container having an open top and bottom, and two cushion members which are pivotally connected to the support structure. Each cushion member may be pivoted between a generally flat position in which the second cushion member overlies the first and a generally upright position in which a storage compartment defined on the sides by the support structure may be accessed by front seated vehicle occupants. Several alternate embodiments are included which provide for additional storage or functional features, such as beverage container holders.

17 Claims, 3 Drawing Sheets

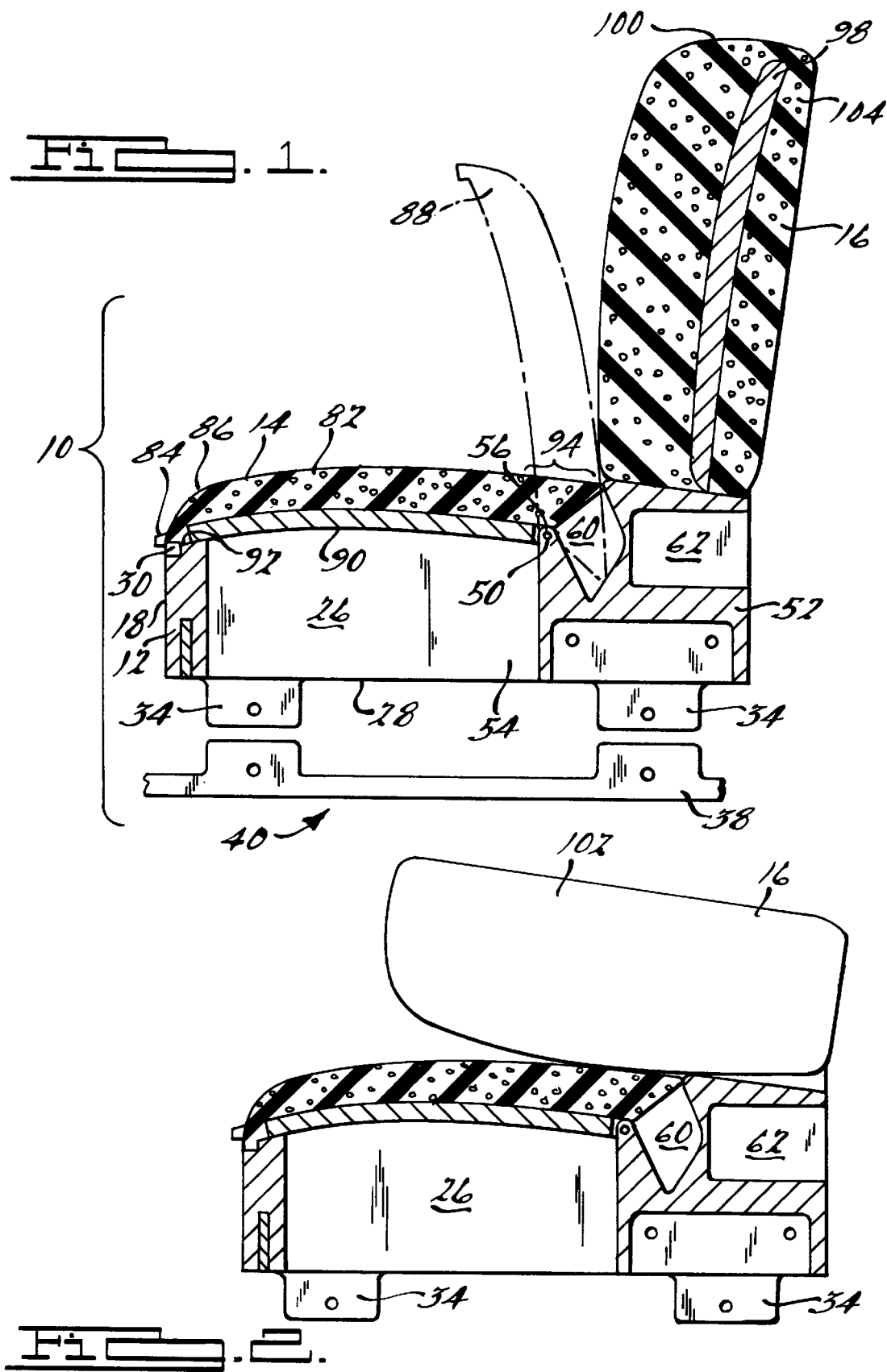

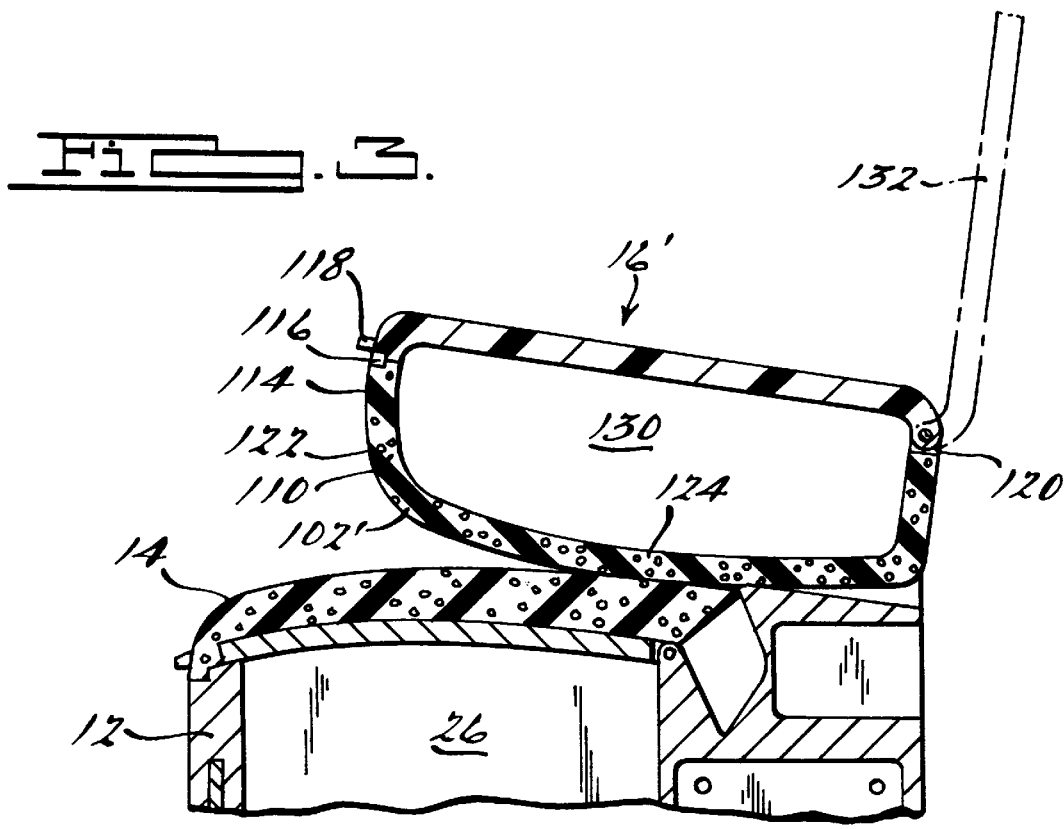
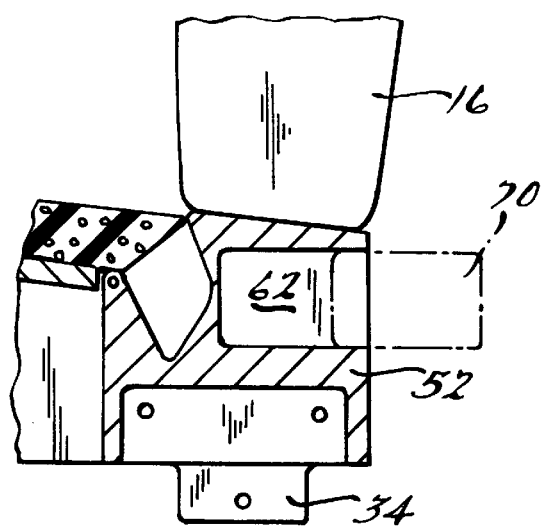

COMBINATION SEAT AND ARMREST WITH STORAGE COMPARTMENTS

BACKGROUND OF THE INVENTION

1. Field of the Invention

The present invention relates generally to a seating unit for use in a vehicle and more particularly to a center member for a bench seat assembly which can be used as an armrest and which includes at least one storage compartment.

2. Discussion

With increased vehicle usage, traffic congestion, urban sprawl and the general acceptance of longer commutes between home and the workplace, the time which vehicle owners are spending in their vehicles is on the increase. Observing this, many vehicle owners attempt to use their vehicle as either a second office for conducting business affairs or as an extension of their home to relax while commuting. As such, vehicle occupants are tending to transport an increasing amount of gear, such as cellular phones, dictation machines, compact discs and cassette tapes. As such, there is a general need and desire to make the interior of the vehicle as comfortable and convenient as possible.

One manner of improving the convenience and comfort of the vehicle interior is to include storage compartments within the seating system of the vehicle which would facilitate the storage of such gear while being readily accessible by the vehicle driver without the need to stop the vehicle and rummage through the glove box or under the driver's seat.

Recognizing this problem, several auxiliary seats for use in motor vehicles have been developed over the years which include one or more storage compartments. Frequently, these seats did not blend well with the vehicle interior, were not robust in their design and did not offer storage areas which could be conveniently accessed by the vehicle driver while operating the vehicle. Furthermore, these prior art auxiliary seats were primarily designed for use in vehicles having bucket-type seats, rather than the split-bench type seating arrangements which are preferred by modern consumers.

Consequently, there remains a need in the art for a robust split-bench type seating system for a vehicle which includes one or more storage compartments which are readily accessible by the vehicle driver while operating the vehicle and which compliments the interior of the vehicle.

SUMMARY OF THE INVENTION

It is therefore one object of the present invention to provide an improved combination seat and armrest for a bench-type seating system.

It is a more specific object of the present invention to provide a combination seat and armrest which provides the front seated vehicle occupants with convenient storage.

It is another object of the present invention to provide a combination seat and armrest which is robust in design but yet aesthetically appealing.

The combination seat and armrest of the present invention is comprised of a support structure, which may be in the form of a container having an open top and bottom, and two cushion members which are pivotally connected to the support structure. Each cushion member may be pivoted between a generally flat position in which the second cushion member overlies the first and a generally upright position in which a storage compartment defined on the sides by the support structure may be accessed by front seated vehicle occupants. Several alternate embodiments are included which provide for additional storage or functional features, such as beverage container holders.

Additional advantages and features of the present invention will become apparent from the subsequent description and the appended claims, taken in conjunction with the accompanying drawings.

DESCRIPTION OF THE DRAWINGS

FIG. 1 is a sectional view of an exemplary combination seat and armrest according to a preferred embodiment of the present invention with the seatback in the upright position;

FIG. 2 is a sectional view of the exemplary combination seat and armrest shown in FIG. 1 with the seatback in the lowered position;

FIG. 3 is a partial sectional view of an exemplary combination seat and armrest according to an alternate embodiment of the present invention;

FIG. 4 is a partial side view of support structure of an exemplary combination seat and armrest according to an alternate embodiment of the present invention;

DETAILED DESCRIPTION OF THE INVENTION

Figure 5:
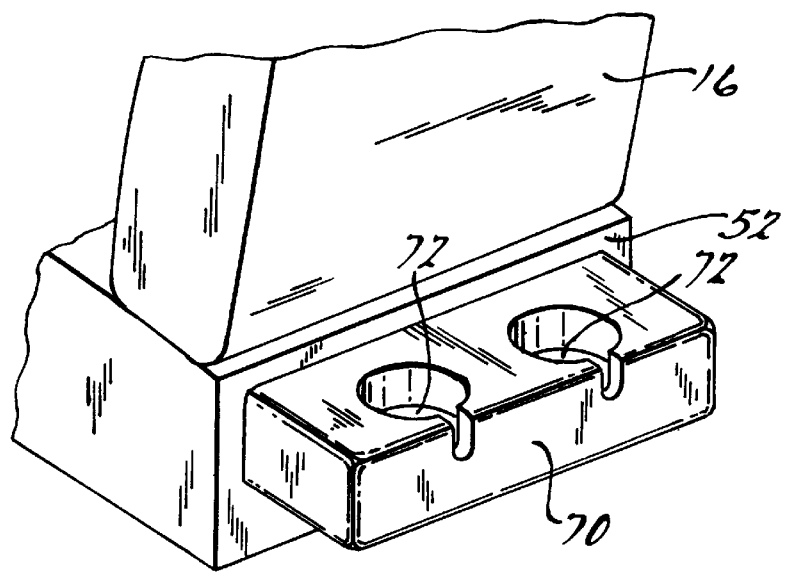
FIG. 5 is a partial rear perspective view of the exemplary combination seat and armrest shown in FIG. 4.

With particular reference to FIGS. 1 and 2, a combination seat and armrest constructed in accordance with the teachings of the present invention is shown. Combination seat 10 is shown to include a support structure 12, a first cushion member 14 and a second cushion member 16.

Support structure 12 includes four substantially vertical walls 18 which are coupled together in the form of a container having an open top, an open bottom and defining a storage area 26. Alternatively, support structure 12 can also include a bottom member (not shown) which seals the lower end 28 of support structure 12. Preferably, support structure is unitarily molded from a composite polypropylene material having a composition which consists of approximately 15% of an appropriate filler material, such as talc or glass and includes a latch member 30 coupled to the front sidewall 32. Support structure 12 is also shown to include an attaching means 34 for securing combination seat 10 to the front seat inboard risers 38. Configuration of the support structure in this manner enables the vehicle floor 40 to form the bottom surface of storage area 26.

A hinge aperture 50 is incorporated into rear sidewall 52 which extends completely through the left sidewall (not shown) and the right sidewall 54. Hinge aperture 50 is operable for receiving a hinge pin 56 which allows first cushion member 14 to be pivotally connected to support structure 12. Connecting first cushion member 14 to support structure 12 in this manner provides an inexpensive yet extremely robust connection that improves the overall appearance of combination seat 10 by concealing the hinge mechanism.

An integral lid aperture 60 and an accessory aperture 62 are included in rear sidewall 52. In the example shown in FIGS. 4 and 5, accessory aperture 62 is shown to be fitted with a rearward deploying, pull-out tray 70. A pair of side-by-side substantially circular openings 72 are formed into tray 70 to accommodate beverage containers (not shown). Alternatively, accessory aperture 62 may be fitted with various other accessories, such as an ashtray (not shown) or may simply serve as a storage compartment for items such as an automobile jack (not shown).

Returning to FIGS. 1 and 2, first cushion member 14 is shown to include a first structural support portion 80, a first cushion portion 82 and a release button 84. Preferably, first structural support portion 80 is fabricated from a composite polypropylene material having a composition which consists of approximately 15% of an appropriate filler material, such as talc or glass. First cushion member 14 is pivotally connected to rear sidewall 52 through hinge pin 56, allowing first cushion member 14 to be pivotally moved between a substantially flat closed position 86 and a substantially vertical open position 88. When placed in closed position 86, first cushion member 14 is supported on its bottom side 90 by the top surface 92 of support structure 12. Supporting first cushion member 14 in this robust manner thereby provides sufficient strength to support the weight of an adult passenger. When first cushion member 14 is placed in the open position 88, a rearward portion 94 is shown to rotate into the integral lid aperture 60, thereby maximizing the volume of storage area 26 as well as allowing unrestricted access to the storage area 26. Release button 84 is operable for selectively engaging latch member 30 when first cushion member 14 is placed in closed position 86. When release button 84 and latch member 30 are so engaged, first cushion member 14 is prevented from pivoting in the direction of open position 88, thereby securely storing any items which have been placed in storage area 26.

Second cushion member 16 is shown to include a second structural support portion 98 and a second cushion portion 100. Preferably, second structural support portion 98 is fabricated from steel tubing. Second cushion member 16 is also shown to be pivotally connected to rear sidewall 52, allowing second cushion member 16 to be pivotally moved between a substantially flat lowered position 102 and a substantially vertical raised position 104. When placed in the lowered position 102, second cushion member functions as an arm rest for both the vehicle operator and a front passenger sitting in a laterally opposite seat (not shown). When placed in the raised position 104, second cushion member 16 functions as a seat back for a passenger seated on the first cushion member 14.

In the alternate embodiment shown in FIG. 3, second cushion member 16' includes first and second portions 110 and 112 which are releasably connected at a first end 114 through a latch member 116 and a release button 118 and pivotally connected at a second end 120. First portion 110 is a shaped as an open topped container and includes a plurality of substantially vertical sidewalls 122 and a bottom surface 124 which define a second storage area 130. Preferably, first portion 110 is a unitary structure molded from a composite polypropylene material having a composition which consists of approximately 15% of an appropriate filler material, such as talc or glass. When second cushion member 16' is placed in the lowered position 102', the vehicle operator may actuate release button 118 to unlatch the first and second portions 110 and 112 and pivotally move the second portion 112 into an upright position 132 to thereby reveal second storage area 130.

Figure 6:
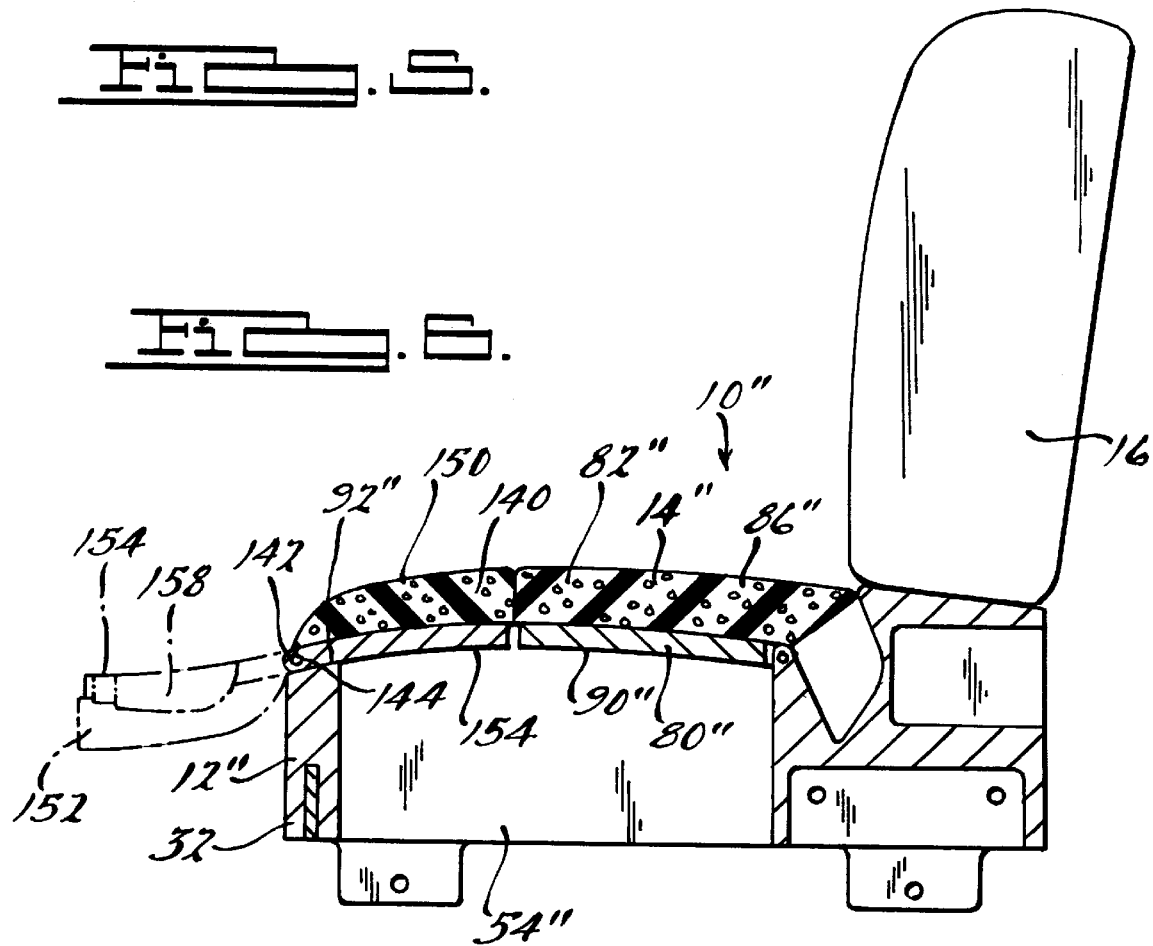
FIG. 6 is a sectional view of an exemplary combination seat and armrest according to a second alternate embodiment of the present invention.

A second alternate embodiment is shown in FIG. 6. Combination seat 10" is similar to combination seat 10 except that first cushion member 14" overlies only a first portion of support structure 12" and a third cushion member 140 which is similar in construction to first cushion member 14 is included. A hinge aperture 142 is incorporated into front sidewall 32" which extends completely through the left sidewall (not shown) and the right sidewall 54". Hinge aperture 142 is operable for receiving a hinge pin 144 which allows third cushion member 140 to be pivotally connected to support structure 12". Connecting third cushion member 140 to support structure 12" in this manner provides an inexpensive yet extremely robust connection that improves the overall appearance of combination seat 10" by concealing the hinge mechanism.

Third cushion member 140 can be pivotally moved between a substantially flat closed position 150 and an open position 152. When placed in the closed position 150, third cushion member 140 overlies a second portion of support structure 12" and is supported by the top surface of support structure 12". First and third cushion members 14" and 140 cooperate to completely close the open top of support structure 12". When placed in the open position 152, third cushion member 140 depends away from support structure 12". As such, bottom surface 154 could include retaining means 158 for holding beverage containers (not shown) for passengers seated to either side of combination seat 10".

While the invention has been described in the specification and illustrated in the drawings with reference to several embodiments, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiments illustrated by the drawings and described in the specification as the best mode presently contemplated for carrying out this invention, but that the invention will include any embodiments falling within the description of the appended claims.

What is claimed is:

1. A center member for a bench seat assembly comprising:
    a supporting structure having a plurality of substantially vertical walls coupled together in the form of a container having an open top and an open bottom, one of said substantially vertical walls being a rear wall;
    a hinge mechanism coupled to said supporting structure;
    a first cushion member coupled to said hinge mechanism thereby pivotally connecting said first cushion member to said rear wall and permitting said first cushion member to be pivotally moved between a generally flat position in which said first cushion member overlies at least a first portion of said open top and is supported by a first upper surface formed by at least two of said substantially vertical walls and a generally upright position in which said first cushion member is in a substantially vertical position;
    a second cushion member pivotally connected to said rear wall permitting said second cushion member to be pivotally moved between a generally flat position in which said second cushion member overlies said first cushion member and a generally upright position in which said second cushion member is in a substantially vertical position.

2. The center member for a bench seat assembly of claim 1 wherein said supporting structure is molded from a composite polypropylene material.

3. The center member for a bench seat assembly of claim 2 wherein said composite polypropylene material includes approximately 15% of a glass filler material.

4. The center member for a bench seat assembly of claim 2 wherein said composite polypropylene material includes approximately 15% of a talc filler material.

5. The center member for a bench seat assembly of claim 1 wherein said supporting structure includes attaching means adapted for securing said center member to a front seat inboard riser.

6. The center member for a bench seat assembly of claim 1 wherein said hinge mechanism is a hinge pin.

7. The center member for a bench seat assembly of claim 1 wherein said supporting structure further includes a rearward deployable beverage holding device.

8. The center member for a bench seat assembly of claim 1 further comprising a third cushion member pivotally connected to a front wall of said supporting structure permitting said third cushion member to be pivotally moved between a generally flat closed position in which said third cushion member overlies at least a second portion of said open top and is supported by a second upper surface formed by at least two of said substantially vertical walls and an open position in which said third cushion member is unsupported by and depends away from said second upper surface.

9. The center member for a bench seat assembly of claim 8 wherein said third cushion member includes a bottom surface which contacts said first upper surface when said third cushion member is in a closed position, said bottom surface including a plurality of recessed beverage retaining devices.

10. The center member for a bench seat assembly of claim 1 wherein said second cushion member further comprises:
   a lower portion having a plurality of substantially vertical walls and shaped as an open topped container; and
   an upper portion, pivotally connected to said lower portion and operable between an open position and a closed position.

11. The center member for a bench seat assembly of claim 10 wherein said lower portion is molded from a composite polypropylene material.

12. The center member for a bench seat assembly of claim 11 wherein said composite polypropylene material includes approximately 15% of a glass filler material.

13. The center member for a bench seat assembly of claim 11 wherein said composite polypropylene material includes approximately 15% of a talc filler material.

14. The center member for a bench seat assembly of claim 10 wherein said second cushion member further includes a latch means and a release means, said latch means coupled to one of said lower portion and said upper portion and said release means coupled to the other of said lower portion and said upper portion, said latch means and said release means operable for selectively coupling or uncoupling said upper and lower portions.

15. The center member for a bench seat assembly of claim 1 wherein said center member further includes a latch means and a release means, said latch means coupled to one of said supporting structure and said first cushion member and said release means coupled to the other of said supporting structure and said first cushion member, said latch means and said release means operable for selectively coupling or uncoupling said supporting structure and said first cushion member.

16. A center member for a bench seat assembly comprising:
   a supporting structure having a plurality of substantially vertical walls coupled together in the form of a container having an open top and an open bottom, one of said substantially vertical walls being a rear wall having an integral lid aperture;
   a hinge mechanism coupled to said supporting structure;
   a first cushion member coupled to said hinge mechanism thereby pivotally connecting said first cushion member to said rear wall and permitting said first cushion member to be pivotally moved between a generally flat position in which said first cushion member overlies at least a first portion of said open top and is supported by a first upper surface formed by at least two of said substantially vertical walls and a generally upright position in which said first cushion member is in a substantially vertical position and a portion of said first cushion member has pivoted within said lid aperture; and
   a second cushion member pivotally connected to said rear wall permitting said second cushion member to be pivotally moved between a generally flat position in which said second cushion member overlies said first cushion member and a generally upright position in which said second cushion member is in a substantially vertical position.

17. A center member for a bench seat assembly comprising:
   a supporting structure having a plurality of substantially vertical walls coupled together forming a readily accessible storage area having an open top and an open bottom, one of said plurality of substantially vertical walls being a rear wall;
   a hinge mechanism coupled to said supporting structure;
   a first cushion member coupled to said hinge mechanism thereby pivotally connecting said first cushion member to said rear wall and permitting said first cushion member to be pivotally moved between a generally flat position in which said first cushion member overlies at least a first portion of said open top and is supported by a first upper surface formed by at least two of said substantially vertical walls and a generally upright position in which said first cushion member is in a substantially vertical position; and
   a floor disposed substantially below said open bottom of said supporting structure to form a bottom of said storage area.

* * * * *